United States Patent
Kuriyavar et al.

(10) Patent No.: US 11,505,971 B2
(45) Date of Patent: Nov. 22, 2022

(54) VEHICLE LATCH MECHANISM

(71) Applicant: Inteva Products, LLC, Troy, MI (US)

(72) Inventors: Sandeep Kuriyavar, Karnataka (IN); Jose Madrid, Juarez Chihuahua (MX); Arun Murthy, Karnataka (IN); Eli Retamoza, Wuppertal (DE); Martin Gustavo Reyes, Juarez Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 384 days.

(21) Appl. No.: 16/441,193

(22) Filed: Jun. 14, 2019

(65) Prior Publication Data

US 2020/0277809 A1 Sep. 3, 2020

(30) Foreign Application Priority Data

Mar. 1, 2019 (IN) .............................. 201911008088

(51) Int. Cl.
*E05B 77/38* (2014.01)
*E05B 85/02* (2014.01)
*B60J 5/04* (2006.01)

(52) U.S. Cl.
CPC .............. *E05B 77/38* (2013.01); *E05B 85/02* (2013.01); *B60J 5/04* (2013.01)

(58) Field of Classification Search
CPC .......... E05B 77/36; E05B 77/38; E05B 77/40; E05B 77/42; E05B 17/0045; E05B 2015/0458; E05B 2015/0468; E05B 85/26; E05B 85/02; Y10T 292/1047; Y10T 292/1078; Y10T 292/1082; Y10S 292/23; Y10S 292/51; Y10S 292/56; Y10S 292/57; Y10S 292/58; Y10S 292/73; Y10S 292/38
See application file for complete search history.

(56) References Cited

U.S. PATENT DOCUMENTS

| | | | |
|---|---|---|---|
| 4,165,112 A * | 8/1979 | Kleefeldt | E05B 85/045 292/216 |
| 5,064,229 A | 11/1991 | Hamada et al. | |
| 5,072,975 A * | 12/1991 | Hamada | E05B 77/38 292/201 |
| 5,606,771 A | 3/1997 | Young | |

(Continued)

FOREIGN PATENT DOCUMENTS

| | | | | |
|---|---|---|---|---|
| DE | 3221049 A1 * | 12/1983 | .............. | E05B 77/38 |
| DE | 102006056101 A1 * | 5/2008 | .............. | E05B 85/26 |

(Continued)

*Primary Examiner* — Alyson M Merlino
(74) *Attorney, Agent, or Firm* — Cantor Colburn LLP

(57) ABSTRACT

A vehicle latch mechanism includes a latch body having a striker receiving zone including a first surface and an opposing second surface. A first guide member extends along and is spaced from the first surface. The first guide member includes a first end, a second, cantilevered end, and an intermediate portion. A second guide member extends along and is spaced from the second surface. The second guide member includes a first end portion, a second cantilevered end portion, and an intermediate section. The second end and the second cantilevered end extend into the striker receiving zone.

16 Claims, 5 Drawing Sheets

(56) References Cited

U.S. PATENT DOCUMENTS

| | | | |
|---|---|---|---|
| 6,024,389 A * | 2/2000 | Arabia, Jr. | E05B 77/38 |
| | | | 292/216 |
| 7,845,692 B2 | 12/2010 | Inan et al. | |
| 8,348,310 B2 * | 1/2013 | Vazquez | E05B 85/26 |
| | | | 292/216 |
| 9,243,430 B2 | 1/2016 | Meyer et al. | |
| 9,617,760 B2 | 4/2017 | Dragon et al. | |
| 9,617,763 B2 | 4/2017 | Graute et al. | |
| 2006/0087126 A1 * | 4/2006 | Roussel | E05B 85/26 |
| | | | 292/116 |
| 2007/0241570 A1 * | 10/2007 | Paskonis | E05B 77/38 |
| | | | 292/340 |

FOREIGN PATENT DOCUMENTS

| | | | | |
|---|---|---|---|---|
| DE | 102008058419 A1 * | 5/2010 | | E05B 77/38 |
| DE | 202012000931 U1 * | 5/2013 | | E05B 85/02 |
| DE | 202016102553 U1 * | 9/2017 | | |
| DE | 102017107902 A1 * | 10/2018 | | E05B 15/04 |
| EP | 1065336 A1 * | 1/2001 | | E05B 85/26 |
| FR | 2175434 A5 * | 10/1973 | | E05B 77/38 |
| WO | WO2018188683 A1 | 10/2018 | | |

\* cited by examiner

VEHICLE LATCH MECHANISM

CROSS REFERENCE TO RELATED APPLICATIONS

This application hereby claims the benefit of the filing date of Mar. 1, 2019 to Indian Patent Application No. 201911008088 filed under provisions of 35 U.S.C. 119 and the International Convention for the protection of Industrial Property.

BACKGROUND

The subject matter disclosed herein relates to the art of motor vehicles and, more particularly, to a latch mechanism for a motor vehicle.

Motor vehicles include a number of surfaces that are secured with latches. Hoods, trunk lids, and doors all include latches that secure the surface in a closed configuration. Typically, a latch mounted on one surface of the vehicle engages with a striker mounted on the corresponding surface. In an example, a door striker may be mounted to a B-pillar while a door latch may be mounted to the door itself.

Vehicle manufacturers strive to reduce and/or eliminate undesirable vehicle noises. One target of noise elimination/reduction is the vehicle door latch. Latching and unlatching the vehicle door causes a latch member to engage with or release the striker. In order to reduce and/or eliminate noise, manufactures have employed a variety of techniques including the use of plastic components, and angled, surfaces that guide the striker into and out from the latch. Despite the incorporation of various noise reduction systems, noise still exists in vehicle latch systems. Accordingly, the art would appreciate additional systems for reducing vehicle latch noise.

SUMMARY

Disclosed is a vehicle latch mechanism including a latch body having a striker receiving zone including a first surface and an opposing second surface. A first guide member extends along and is spaced from the first surface. The first guide member includes a first end, a second, cantilevered end, and an intermediate portion. A second guide member extends along and is spaced from the second surface. The second guide member includes a first end portion, a second cantilevered end portion, and an intermediate section. The second end and the second cantilevered end extend into the striker receiving zone.

Also disclosed is a vehicle including a body having a striker, a prime mover supported in the body, and at least one selectively shiftable surface connected to the body. The at least one selectively shiftable surface includes a latch mechanism operable to selectively engage the striker. The latch mechanism includes a latch body including a striker receiving zone having a first surface and an opposing second surface. The striker receiving zone selectively receives the striker. A first guide member extends along and is spaced from the first surface. The first guide member includes a first end, a second, cantilevered end, and an intermediate portion. A second guide member extends along and is spaced from the second surface. The second guide member includes a first end portion, a second cantilevered end portion, and an intermediate section. The second end and the second cantilevered end extend into the striker receiving zone.

BRIEF DESCRIPTION OF THE DRAWINGS

Referring now to the drawings wherein like elements are numbered alike in the Figures.

DETAILED DESCRIPTION

Figure 1:
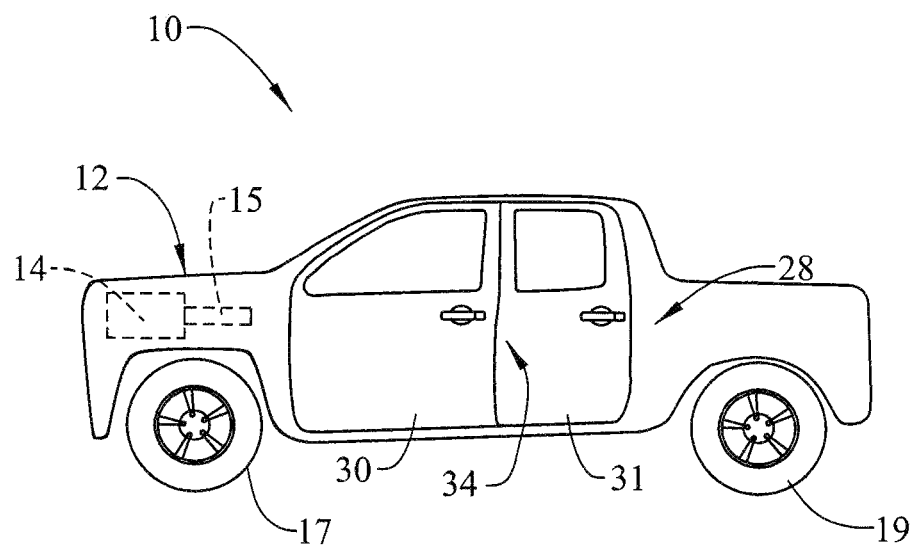
FIG. 1 depicts a vehicle including a latch mechanism, in accordance with an exemplary embodiment.

A vehicle, in accordance with an exemplary embodiment, is indicted generally at 10 in FIG. 1. Vehicle 10 includes a body 12 that supports a prime mover 14 coupled to a transmission 15. Transmission 15 may be connected to one or more of front wheels 17 and rear wheels 19. Vehicle 10 is also shown to include a plurality of selectively shiftable surfaces 28 which may take the form of a front door 30 and a rear door 31. Each door 30, 31 includes a corresponding latch mechanism, one of which is indicated at 34. While described as being mounted on front door 30, latch mechanism 34 may be used in connection with any vehicle closure.

Figure 2:
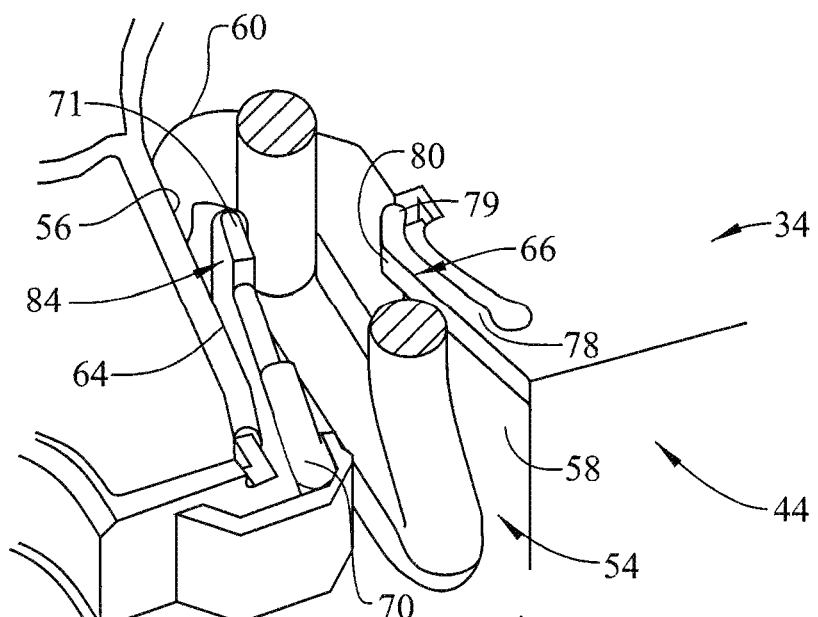
FIG. 2 depicts a latch mechanism engaged with a striker, in accordance with an aspect of an exemplary embodiment.
Figure 3:
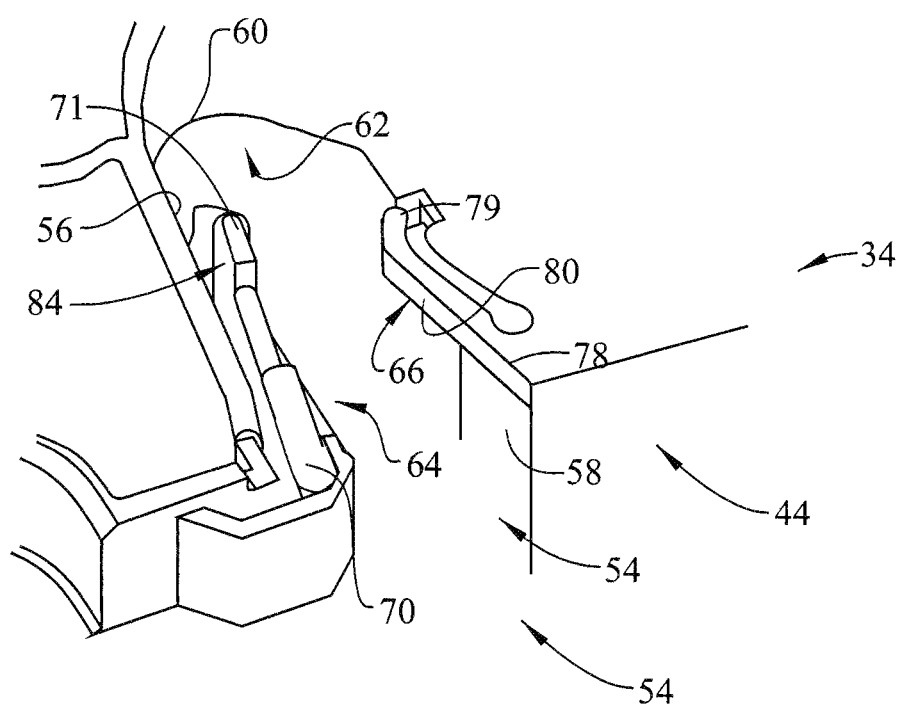
FIG. 3 depicts the latch mechanism of FIG. 2, in accordance with an aspect of an exemplary embodiment.
Figure 4:
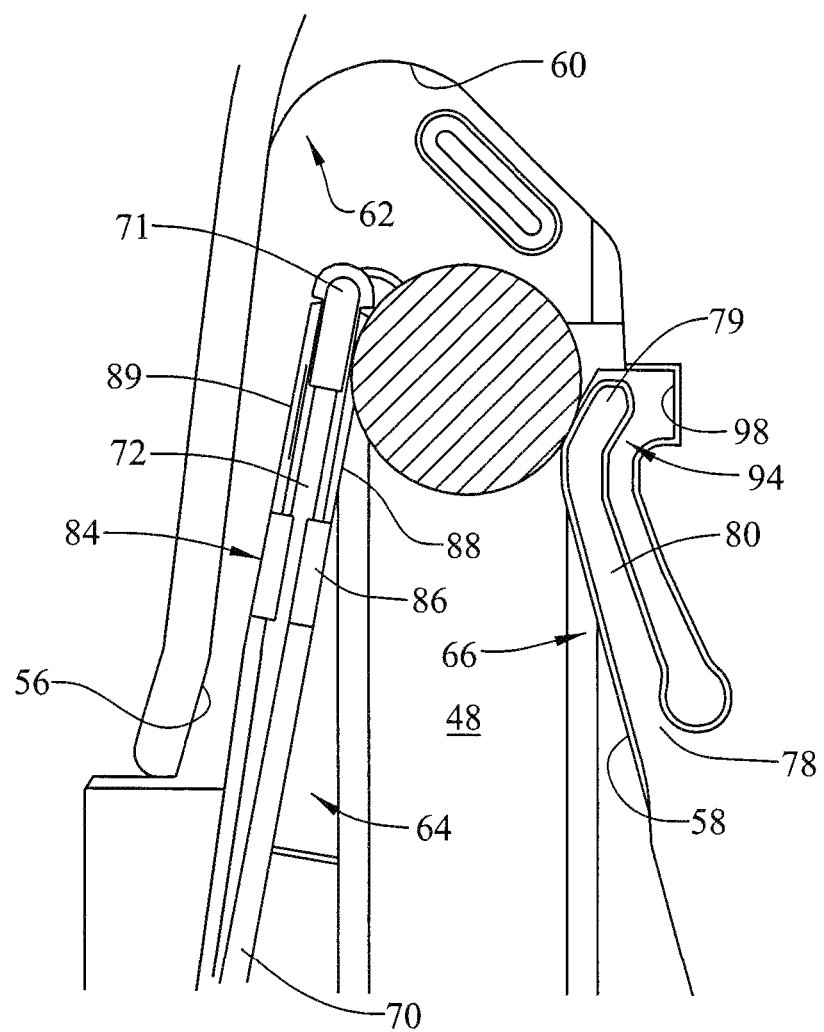
FIG. 4 depicts a schematic view of the latch mechanism of FIG. 2, in accordance with an aspect of an exemplary embodiment.

Referring to FIGS. 2-4, latch mechanism 34 includes a latch body 44 that may be mounted to front door 30. Latch body 44 is receptive of a striker 48 that may be fixedly mounted to body 12. In an embodiment, latch body 44 includes a striker receiving zone 54 having a first surface 56, an opposing, second surface 58 and an end surface 60 forming a continuous wall 62. In an embodiment, first surface 56 and second surface 58 converge toward end surface 60. A first guide member 64 extends into striker receiving zone 54 from first surface 56. A second guide member 66 extends into striker receiving zone 54 from second surface 58. A latch claw (not shown) selectively retains striker 48 in striker receiving zone 54.

First guide member 64 extends along and is spaced from first surface 56 and second guide member 66 extends along and is spaced from second surface 58. As will be detailed herein, first and second guide members 64 and 66 guide striker 48 into striker receiving zone 54. In addition to guiding striker 48, first and second guide members 64 and 66 substantially eliminate noise that may develop when latching front door 30.

First guide member 64 includes a first end 70 that extends from latch body 44, a second, cantilevered end 71 and an intermediate portion 72 extending therebetween. First end 70 may be detachable mounted to latch body 44. More specifically, first end 70 may have a slip-fit arrangement with latch body 44. Second guide member 66 includes a first end portion 78, a second, cantilevered end portion 79, and an intermediate section 80 extending therebetween. First end portion 78 may be integrally formed with latch body 44.

In an embodiment, first guide member 64 may support a spring clip 84 (FIG. 4) having one or more clip elements 86. Clip elements 86 secure spring clip 84 to first guide member 64. Spring clip 84 includes a first spring member 88 and a second spring member 89. First spring member 88 provides wear protection may reduce direct physical interactions between striker 48 which may be formed from a metal, and first guide member 64 which may be formed from plastic.

In an embodiment, second end portion 79 of second guide member 66 includes an angled end 94. Angled end 94 projects toward second surface 58 which may include a recess 98. Recess 98 is receptive of angled end 94 when striker 48 engages first and second guide members 64 and 66. With this arrangement, first and second guide members 64 and 66 may be engaged by striker 48 when closing front door 30. First and second guide members deflect outwardly allowing striker 48 to move toward end surface 60. By engaging both sides of striker 48, first and second guide members reduce clearances that may result in undesirable component interactions that could lead to unwanted noise from latch mechanism 34. First and second guide members also decelerate latch mechanism claw opening to further reduce unwanted noise.

Figure 5:
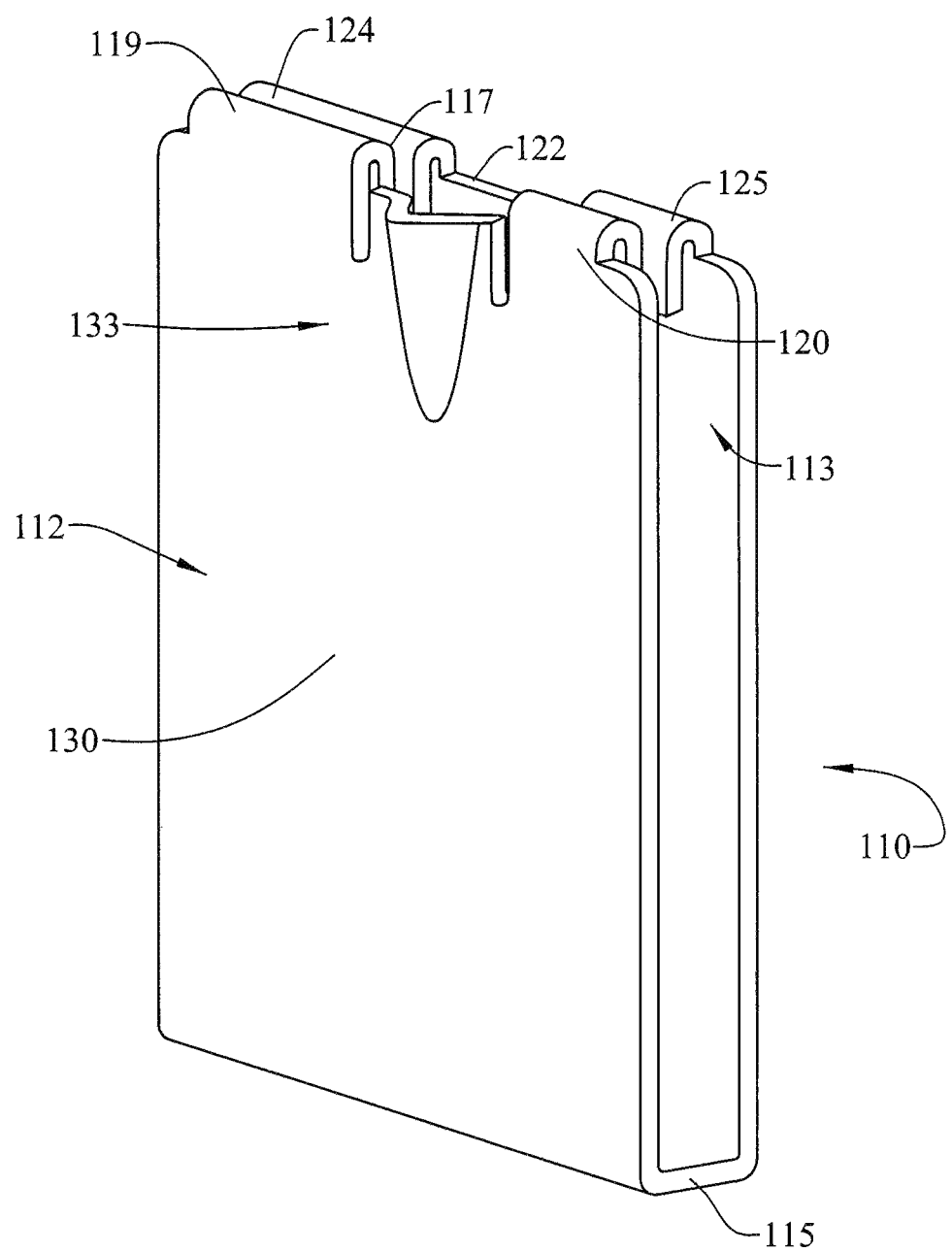
FIG. 5 depicts a plan view of a spring member of the latch mechanism, in accordance with an aspect of an exemplary embodiment.
Figure 6:
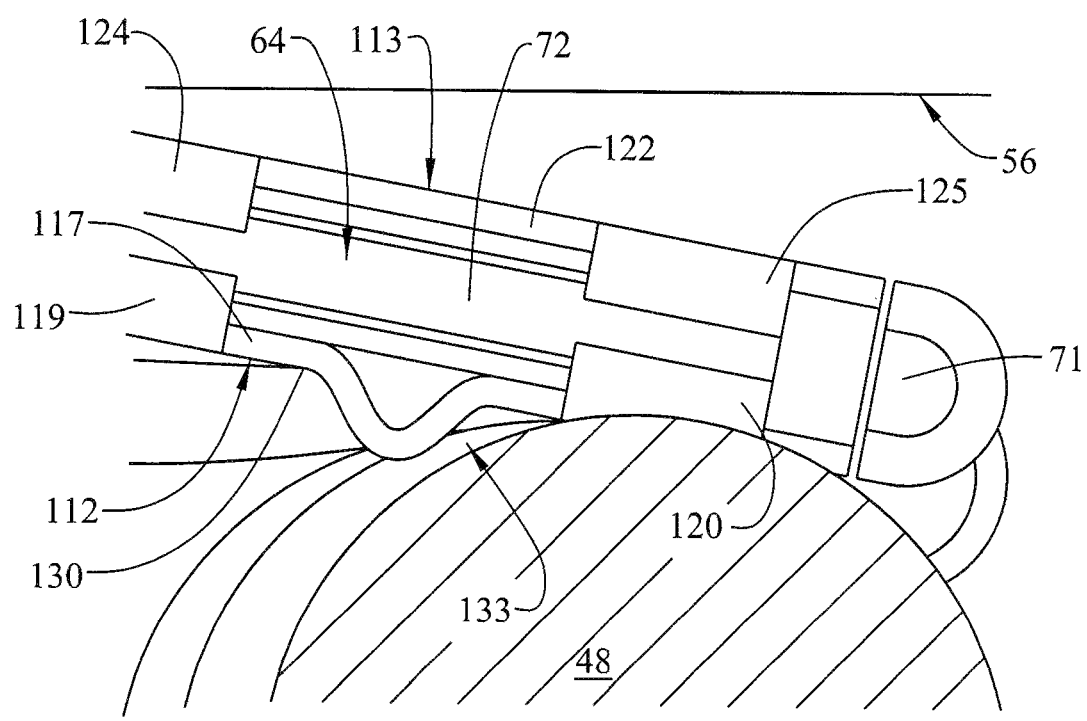
FIG. 6 depicts the spring member engaging with a striker, in accordance with an aspect of an exemplary embodiment.

Reference will now follow to FIGS. 5 and 6 in describing a spring clip 110 in accordance with another aspect of an exemplary embodiment. Spring clip 110 includes a first spring member 112 and a second spring member 113 joined by a base member 115. First spring member 112 includes an edge portion 117 opposite base member 115 that supports a first clip element 119 and a second clip element 120. Second spring member 113 includes an edge section 122 opposite to base member 115 that supports a third clip element 124 and a fourth clip element 125. First guide member 64 is arranged between first and second spring members 112 and 113 with first, second, third, and fourth clip elements 119, 120, 124, and 125 providing an attachment mechanism.

First spring member 112 includes an outer surface 130. When spring clip 110 is mounted to first guide member 65, outer surface 130 faces into striker receiving zone 54. In accordance with an exemplary aspect, a projection 133 is formed on outer surface 130 adjacent edge portion 117. Projection 133 projects outwardly into striker receiving zone 54. Projection 133 may decelerate latch claw opening through engagement with striker 48 to reduce unwanted noise from latch mechanism 34.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Finally, it is to be understood while one or more embodiments have been shown and described, modifications and substitutions may be made thereto without departing from the spirit and scope of the invention. Accordingly, it is to be understood that the present invention has been described by way of illustrations and not limitation.

What is claimed is:

1. A vehicle latch mechanism comprising:
    a latch body including a striker receiving zone having a first surface and an opposing second surface;
    a first guide member extending along and spaced from the first surface, the first guide member including a fixed end, a cantilevered end, and an intermediate portion;
    a spring clip mounted on the first guide member, the spring clip including a first spring member, a second spring member, and a base member joining the first spring member to the second spring member, the first spring member including a projection that projects into the striker receiving zone and is engageable by a striker; and
    a second guide member extending along and spaced from the second surface, the second guide member including a fixed end portion, a cantilevered end portion, and an intermediate section, the cantilevered end and the cantilevered end portion extending into the striker receiving zone.

2. The vehicle latch mechanism according to claim 1, wherein the striker receiving zone includes a continuous wall defining the first surface and the second surface, the continuous wall includes an end surface that joins the first surface and the second surface.

3. The vehicle latch mechanism according to claim 2, wherein the first and second surfaces converge toward the end surface.

4. The vehicle latch mechanism according to claim 1, wherein each of the first and second spring members includes at least one clip element that engages the first guide member.

5. The vehicle latch mechanism according to claim 4, wherein the first guide member is arranged between the first spring member and the second spring member when the spring clip is mounted to the first guide member.

6. The vehicle latch mechanism according to claim 1, wherein the cantilevered end portion of the second guide member includes an angled end that extends at an angle relative to the intermediate section.

7. The vehicle latch mechanism according to claim 6, wherein the second surface includes a recess, the angled end selectively projects into the recess.

8. The vehicle latch mechanism according to claim 1, wherein the second guide member is integrally formed with the latch body.

9. A vehicle comprising:
    a body including a striker;
    a prime mover supported in the body;
    at least one selectively shiftable surface connected to the body, the at least one selectively shiftable surface including a latch mechanism operable to selectively engage the striker, the latch mechanism comprising:
        a latch body including a striker receiving zone having a first surface and an opposing second surface, the striker receiving zone selectively receiving the striker;
        a first guide member extending along and spaced from the first surface, the first guide member including a fixed end, a cantilevered end, and an intermediate portion;
        a spring clip mounted on the first guide member, the spring clip including a first spring member, a second spring member, and a base member joining the first spring member to the second spring member, the first spring member including a projection that projects into the striker receiving zone and being engageable by the striker; and
        a second guide member extending along and spaced from the second surface, the second guide member including a fixed end portion, a cantilevered end portion, and an intermediate section, the cantilevered end and the cantilevered end portion extending into the striker receiving zone.

10. The vehicle according to claim 9, wherein the striker receiving zone includes a continuous wall defining the first surface and the second surface, the continuous wall includes an end surface that joins the first surface and the second surface.

11. The vehicle according to claim 10, wherein the first and second surfaces converge toward the end surface.

12. The vehicle according to claim 9, wherein each of the first and second spring members includes at least one clip element that engages the first guide member.

13. The vehicle according to claim 12, wherein the first guide member is arranged between the first spring member and the second spring member when the spring clip is mounted to the first guide member.

14. The vehicle according to claim 9, wherein the cantilevered end portion of the second guide member includes an angled end that extends at an angle relative to the intermediate section.

15. The vehicle according to claim 14, wherein the second surface includes a recess, the angled end selectively projects into the recess.

16. The vehicle according to claim 9, wherein the second guide member is integrally formed with the latch body.

\* \* \* \* \*